(12) United States Patent
Henderson

(10) Patent No.: US 11,486,429 B1
(45) Date of Patent: Nov. 1, 2022

(54) TUBULAR RAFT RAILING AND ASSOCIATED METHODS

(71) Applicant: Robert Henderson, Bozeman, MT (US)

(72) Inventor: Robert Henderson, Bozeman, MT (US)

( * ) Notice: Subject to any disclaimer, the term of this patent is extended or adjusted under 35 U.S.C. 154(b) by 0 days.

(21) Appl. No.: 17/826,468

(22) Filed: May 27, 2022

(51) Int. Cl.
*F16B 7/02* (2006.01)

(52) U.S. Cl.
CPC ...................................... *F16B 7/02* (2013.01)

(58) Field of Classification Search
CPC .. F16B 7/02; F16B 7/025; F16B 7/004; F16B 7/0453; F16B 7/18
See application file for complete search history.

(56) References Cited

U.S. PATENT DOCUMENTS

| | | | | |
|---|---|---|---|---|
| 1,404,522 | A * | 1/1922 | Harris | F16B 7/0446 403/190 |
| 1,460,928 | A * | 7/1923 | Tilden | F16B 17/004 403/247 |
| 1,840,048 | A | 1/1932 | Michelman | |
| 2,018,250 | A * | 10/1935 | Cohan | F16B 7/0446 403/237 |
| 2,496,032 | A | 1/1950 | Austin | |
| 2,557,766 | A * | 6/1951 | Ronfeldt | F16B 7/0446 403/258 |
| 2,647,000 | A | 7/1953 | Colley | |
| 2,815,972 | A * | 12/1957 | Lagervall | E04G 7/02 403/260 |
| 2,835,513 | A | 5/1958 | Pearson | |
| 3,519,292 | A | 7/1970 | Krikorian | |
| 3,674,293 | A * | 7/1972 | Parsons | F16B 7/0446 403/234 |
| 3,787,131 | A * | 1/1974 | Reachek | E04G 7/22 403/234 |
| 3,850,534 | A | 11/1974 | OHalloran | |

(Continued)

FOREIGN PATENT DOCUMENTS

| | | |
|---|---|---|
| DE | 4100624 C1 | 7/1992 |
| DE | 4210488 A1 | 10/1993 |

(Continued)

*Primary Examiner* — Daniel J Wiley
(74) *Attorney, Agent, or Firm* — Granite Peak Law, PLLC; Paul Ditmyer; Adam Owens

(57) ABSTRACT

The connector assembly joins first and second hollow tubular elements. The connector assembly includes an anchor plug inserted into the first hollow tubular element, and having a second anchor plug opening that is elongated. A connector fitting is inserted into an end of the second hollow tubular element, and has a receiving portion to receive an exterior surface of the first hollow tubular element. The connector fitting includes an elongated-shaped receiver extending inward from the receiving portion, and includes a fastener receiver at a bottom of the elongated-shaped receiver. A torsion bar is configured to extend between the anchor plug and the connector fitting, and includes a tapered top defining a wedge. In operation, when a fastener is positioned and tightened, the bottom of the torsion bar is rigidly secured within the elongated-shaped receiver of the connector fitting, and the tapered top of the torsion bar is rigidly secured within the anchor plug via the second anchor plug opening.

18 Claims, 8 Drawing Sheets

(56) References Cited

U.S. PATENT DOCUMENTS

| | | | | |
|---|---|---|---|---|
| 3,891,334 | A | * | 6/1975 | Loikitz ................. F16B 7/0446 403/234 |
| 3,945,743 | A | * | 3/1976 | Koch ...................... F16B 12/40 312/263 |
| 3,982,841 | A | | 9/1976 | Endzweig |
| 4,013,372 | A | | 3/1977 | Lay |
| 4,190,375 | A | * | 2/1980 | Berry ..................... F16B 7/025 403/187 |
| 4,355,919 | A | | 10/1982 | Lievonen |
| 4,358,214 | A | | 11/1982 | Shull |
| 4,386,870 | A | * | 6/1983 | Baroody ............... F16B 7/0453 403/260 |
| 4,475,840 | A | | 10/1984 | Schmitt |
| 4,603,996 | A | * | 8/1986 | Chen ....................... F16B 7/025 403/237 |
| 4,761,093 | A | * | 8/1988 | Seymour ................. F16B 7/025 403/237 |
| 4,783,189 | A | * | 11/1988 | Bugg ...................... F16B 7/046 403/264 |
| 4,846,600 | A | * | 7/1989 | Strand .................... F16B 12/40 403/264 |
| 4,921,370 | A | | 5/1990 | Handler |
| 4,952,092 | A | | 8/1990 | Ballerstein |
| 5,028,071 | A | | 7/1991 | Bolam |
| 5,062,732 | A | | 11/1991 | Ballerstein |
| 5,230,581 | A | | 7/1993 | Deng |
| 5,232,304 | A | * | 8/1993 | Huang .................... F16B 7/025 403/409.1 |
| 5,310,298 | A | | 5/1994 | Hwang |
| 5,765,960 | A | | 6/1998 | Caripinella |
| 5,931,599 | A | * | 8/1999 | Kuenzi ..................... F16B 2/08 403/374.4 |
| 6,227,752 | B1 | * | 5/2001 | Friedrich ............... F16B 7/0453 403/260 |
| 7,448,820 | B1 | * | 11/2008 | Faber ........................ F16B 7/18 403/263 |
| 7,641,180 | B2 | | 1/2010 | Adderton |
| 9,039,091 | B1 | * | 5/2015 | Liu ........................... A47C 3/00 297/440.15 |
| 2005/0042024 | A1 | * | 2/2005 | Patrignani ............... F16B 12/40 403/297 |
| 2012/0234418 | A1 | * | 9/2012 | Lemoine .................. E04G 7/18 137/798 |
| 2013/0183081 | A1 | * | 7/2013 | Oxley .................. F16B 7/0446 403/207 |

FOREIGN PATENT DOCUMENTS

| | | |
|---|---|---|
| DE | 102013110983 A1 | 4/2015 |
| DE | 102017011731 A1 | 6/2019 |
| EP | 1233192 A2 | 8/2002 |
| EP | 2208895 A2 | 7/2010 |
| FR | 1553971 A | 1/1969 |
| FR | 2448065 A1 | 8/1980 |
| GB | 448527 A | 6/1936 |
| GB | 758293 A | 10/1956 |
| GB | 958706 A | 5/1964 |
| GB | 1232489 A | 5/1971 |
| GB | 2274698 A | 8/1994 |

* cited by examiner

TUBULAR RAFT RAILING AND
ASSOCIATED METHODS

FIELD OF THE INVENTION

The present invention relates to tubular joints and methods, and more specifically to tubular joints for rafts and other railings.

BACKGROUND

A variety of products are fabricated from tubing. Such products include but not limited to, railings, raft frames, disability aids, metal furniture, serving carts, display units, scaffolding, etc.

Tubular products may be brazed or welded to create a joint. Clamping is another method of joining tubular elements. Tube clamping eliminates some of the problems associated with welded/brazed joints but is more expensive to execute and is not as aesthetically pleasing as utilizing connector fittings. Examples of clamping designs are disclosed in U.S. Pat. Nos. 5,253,888, 4,294,561 and 4,039,263. The use of connector fittings may increase the structural strength and durability of the tubular joint, and reduce fatigue failure. The connector fitting allows for component replacement, modular construction and product customization.

Tube connectors developed for rigidly joining tube sections in such products include compression fittings, as disclosed in U.S. Pat. Nos. 4,921,370 and 3,985,460, that do not positively lock in the inside diameter of one of the tubes and may rotate axially. Other types of tubular connector are described in U.S. Pat. Nos. 4,846,600 and 4,752,979. This design uses an eye bolt type fastener, a notched tube member and a screw to hold the assembly together. With this design, the tubes may distort when the screws are tightened securely and the joint may loosen over time. A design that uses a formed sheet metal nut that is pressed into the inside diameter of a tubular member is disclosed in U.S. Pat. No. 4,810,144. This design relies on spring tension of the teeth of the nut to grip the inside diameter of the tube when a screw is tightened. There is no positive locking, the nut may loosen and/or rotate within the tube. Another disadvantage of the joints described above is that the screw attached to the first tube section goes through one or both walls of the tube. This increases stress and deformation of the tube and leaves a screw head showing at the front of the tube. It is possible to crush or deform the tube by the action of substantial forces acting on the tubular walls when the screw is tightened.

U.S. Pat. No. 6,227,752 is directed to a weldless method and connector fitting for joining tubular elements. The method includes the use of an insert but still results in the fastener or screw exerting forces on the opening in the tubular element through which it extends.

Accordingly, it may be desired to provide a method and connector assembly for joining tubular elements that does not include undesirable forces acting between the fastener and the walls of the tubular elements which may cause wear, warp and/or deformation therein, which may eventually lead to loosening and/or failure of the joint.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a secure and reliable connector assembly for joining tubular elements that reduces or eliminates undesirable forces acting between the fastener and the walls of the tubular elements.

This and other objects, advantages and features in accordance with the present invention may be provided by a connector assembly configured to join first and second hollow tubular elements. The connector assembly includes a cylindrical anchor plug configured to be inserted into the first hollow tubular element, and has a transverse fastener through-hole extending from first and second anchor plug openings, wherein the second insert opening is elongated. A cylindrical connector fitting has a reduced diameter portion at a first end configured to be inserted into an end of the second hollow tubular element, and has an arcuate receiving portion at a second end configured to receive a rounded surface of the first hollow tubular element. The cylindrical connector fitting includes an elongated-shaped receiver extending inward from the arcuate receiving portion, and includes a fastener receiver at a bottom of the elongated-shaped receiver. A torsion bar is configured to matingly extend between the cylindrical anchor plug and the cylindrical connector fitting. The torsion bar includes an axial fastener through-hole extending from a bottom to a tapered top thereof. The bottom of the torsion bar is configured to be rigidly secured within the elongated-shaped receiver of the cylindrical connector fitting, and the tapered top of the torsion bar is configured to be rigidly secured within the cylindrical anchor plug via the second anchor plug opening, when a fastener is positioned and tightened within the transverse fastener through-hole, the axial fastener through-hole and the fastener receiver.

Additionally, and/or alternatively, the fastener receiver is a threaded fastener receiver to receive a threaded end of the fastener.

Additionally, and/or alternatively, the first anchor plug opening in the cylindrical anchor plug includes a counter-bore to receive a head of the fastener.

Additionally, and/or alternatively, the second anchor plug opening is elongated in an axial direction of the cylindrical anchor plug.

Additionally, and/or alternatively, the elongated-shaped receiver is stadium-shaped, a cross-section of the torsion bar is stadium-shaped, and the second insert opening of the cylindrical anchor plug is stadium-shaped.

Additionally, and/or alternatively, the tapered top of the torsion bar defines a wedge.

Another embodiment of the present invention is directed to a connector assembly configured to join first and second hollow tubular elements. The connector assembly includes an anchor plug configured to be inserted into the first hollow tubular element, and having a transverse fastener through-hole extending from first and second anchor plug openings, wherein the second anchor plug opening is elongated. A connector fitting has a reduced dimension portion at a first end configured to be inserted into an end of the second hollow tubular element, and has a receiving portion at a second end configured to receive an exterior surface of the first hollow tubular element. The connector fitting includes an elongated-shaped receiver extending inward from the receiving portion, and includes a fastener receiver at a bottom of the elongated-shaped receiver. A torsion bar is configured to extend between the anchor plug and the connector fitting, and includes a tapered top defining a wedge. The torsion bar includes an axial fastener through-hole extending from a bottom to the tapered top thereof. In operation, when a fastener is positioned and tightened within the transverse fastener through-hole, the axial fastener through-hole and the fastener receiver, the bottom of the torsion bar is rigidly secured within the elongated-shaped receiver of the connector fitting, and the tapered top of the torsion bar is rigidly secured within the anchor plug via the second anchor plug opening.

Additionally, and/or alternatively, the fastener receiver is a threaded fastener receiver to receive a threaded end of the fastener.

Additionally, and/or alternatively, the first opening in the anchor plug includes a counterbore to receive a head of the fastener.

Additionally, and/or alternatively, the second anchor plug opening is elongated in an axial direction of the anchor plug.

Additionally, and/or alternatively, the elongated-shaped receiver is stadium-shaped, a cross-section of the torsion bar is stadium-shaped, and the second anchor plug opening of the anchor plug is stadium-shaped.

Additionally, and/or alternatively, the first and second hollow tubular elements to be joined are cylindrical hollow tubular elements, and the anchor plug comprises a cylindrical anchor plug, and the connector fitting comprises a cylindrical connector fitting.

Another embodiment of the present invention is directed to a method of joining first and second hollow tubular elements. The method includes: inserting an anchor plug into the first hollow tubular element, the anchor plug comprising a transverse fastener through-hole extending from first and second anchor plug openings, wherein the second anchor plug opening is elongated; forming corresponding first and second tube openings in the first hollow tubular element, wherein the second tube opening is elongated to match up with the second anchor plug opening of the first hollow tube element; inserting a connector fitting, having a reduced dimension portion at a first end, into an end of the second hollow tubular element; the connector fitting having a receiving portion at a second end configured to receive an exterior surface of the first hollow tubular element; the connector fitting including an elongated-shaped receiver extending inward from the receiving portion, and including a fastener receiver at a bottom of the elongated-shaped receiver; inserting a bottom of a torsion bar into the elongated-shaped receiver of the connector fitting; inserting, a tapered top of the torsion bar into the second anchor plug opening of the anchor plug via the second tube opening of the first hollow tubular element, the tapered top defining a wedge; the torsion bar including an axial fastener through-hole extending from the bottom to the tapered top thereof; and positioning and tightening a fastener within the transverse fastener through-hole, the axial fastener through-hole and the fastener receiver, to rigidly secure the bottom of the torsion bar within the elongated-shaped receiver of the connector fitting, rigidly secure the tapered top of the torsion bar within the anchor plug via the second anchor plug opening, and rigidly secure the receiving portion to the exterior surface of the first hollow tubular element adjacent the second tube opening therein.

Additionally, and/or alternatively, the fastener receiver is a threaded fastener receiver to receive a threaded end of the fastener.

Additionally, and/or alternatively, the first opening in the anchor plug includes a counterbore to receive a head of the fastener.

Additionally, and/or alternatively, the second anchor plug opening is elongated in an axial direction of the anchor plug, and the second tube opening of the first hollow tube element is elongated in an axial direction of the first hollow tube element.

Additionally, and/or alternatively, the elongated-shaped receiver is stadium-shaped, a cross-section of the torsion bar is stadium-shaped, the second anchor plug opening of the anchor plug is stadium-shaped, and the second tube opening of the first hollow tube element is stadium-shaped.

Additionally, and/or alternatively, the first and second hollow tubular elements to be joined are cylindrical hollow tubular elements; and wherein the anchor plug comprises a cylindrical anchor plug, and the connector fitting comprises a cylindrical connector fitting.

BRIEF DESCRIPTION OF THE DRAWINGS

The present invention will become more fully understood from the detailed description and the accompanying drawings, wherein.

DETAILED DESCRIPTION OF THE INVENTION

Figure 1:
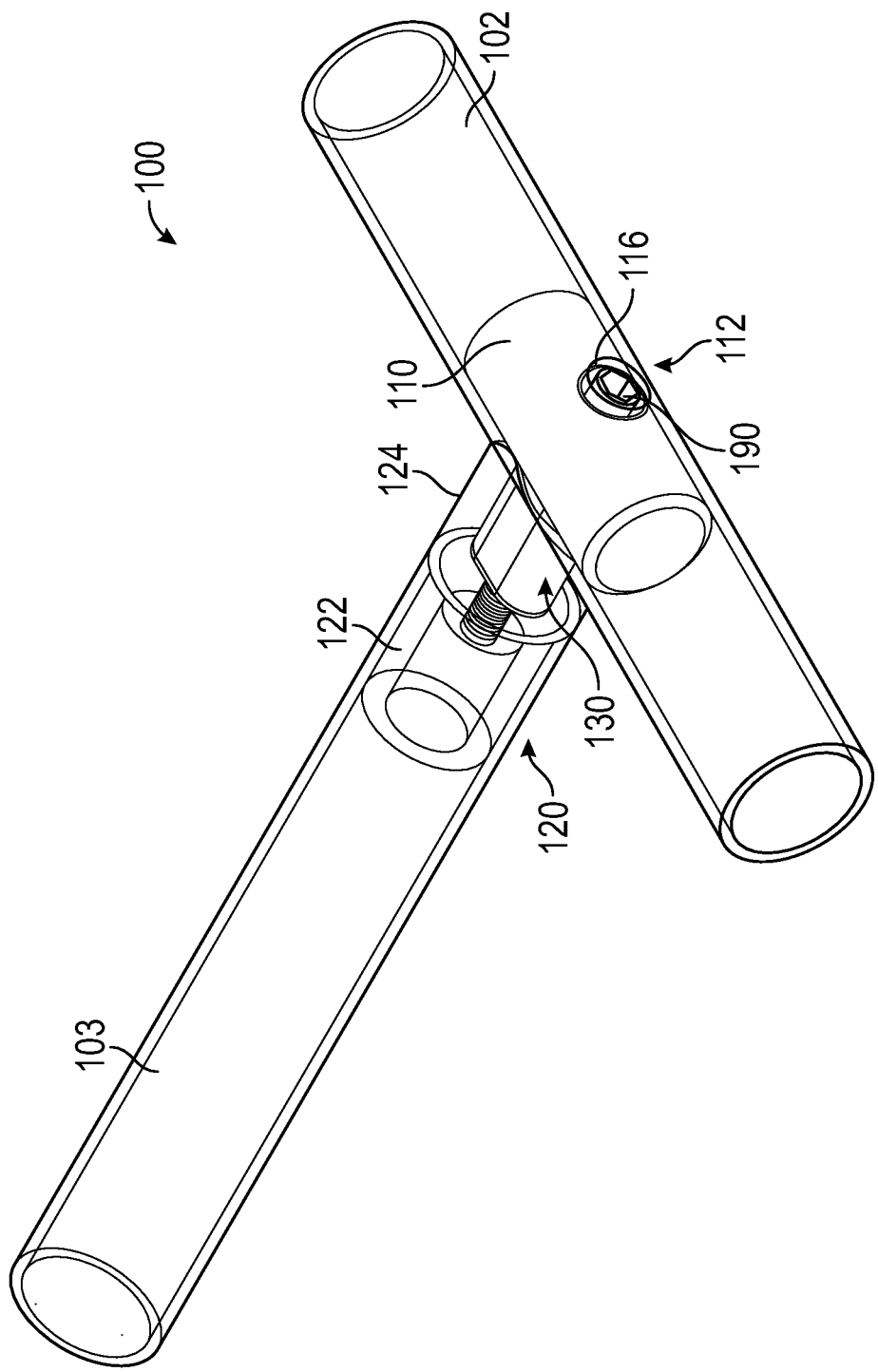
FIG. 1 is a perspective view illustrating an embodiment of a connector assembly, joining hollow tubular elements, in accordance with features of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure, and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

An object of the present embodiments may be to provide a connector assembly for joining tubular elements that reduces or eliminates undesirable forces acting between the fastener and the walls of the tubular elements. Another object of the present embodiments may be to strengthen the joint between the tubular elements. Tubular joints may be needed in such products including, but not limited to, railings, raft frames, disability aids, metal furniture, serving carts, display units, scaffolding, etc.

Referring to FIGS. 1-11, an example embodiment including a system, device and method according to features of the present invention is described and illustrated. The example embodiments are best understood from the following detailed description when read with the accompanying drawing figures. Dimensions may be arbitrarily increased or decreased for clarity of discussion.

Figure 2:
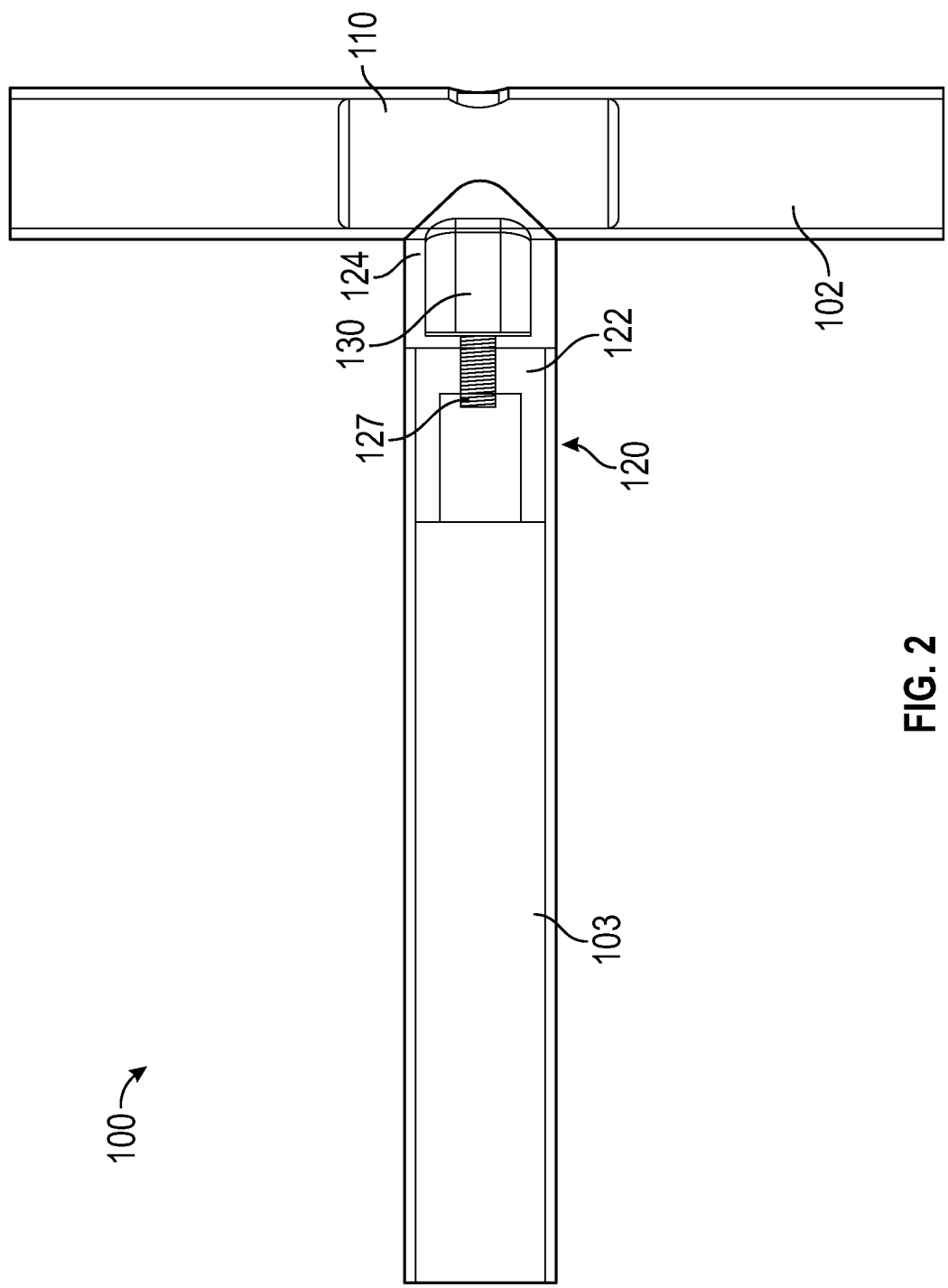
FIG. 2 is a plan view of the connector assembly of FIG. 1.
Figure 3A:
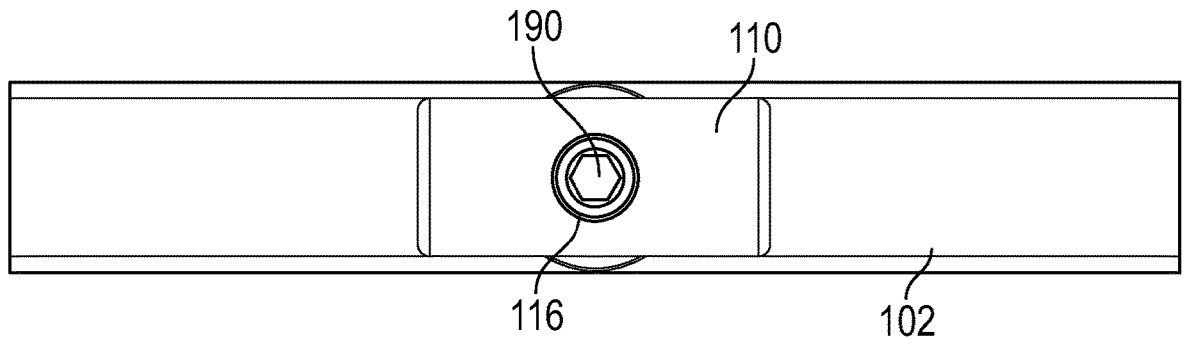
FIG. 3A is a top view of the connector assembly of FIG. 1.
Figure 3B:
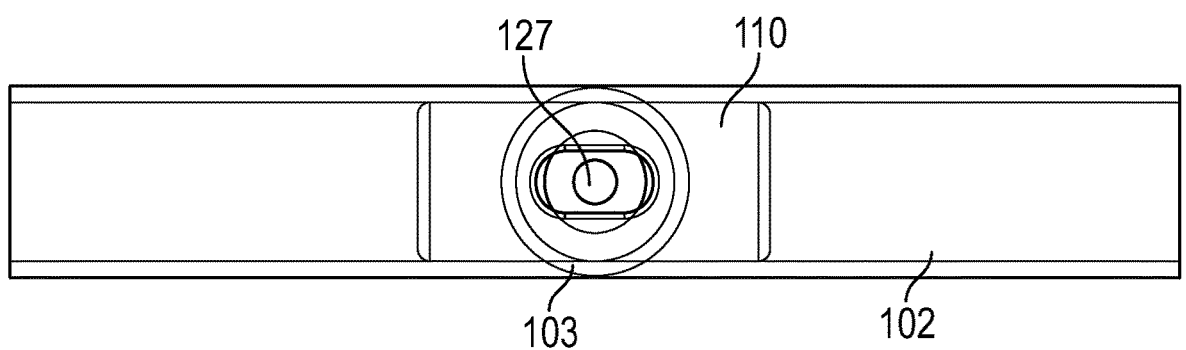
FIG. 3B is a bottom view of the connector assembly of FIG. 1.
Figure 4:
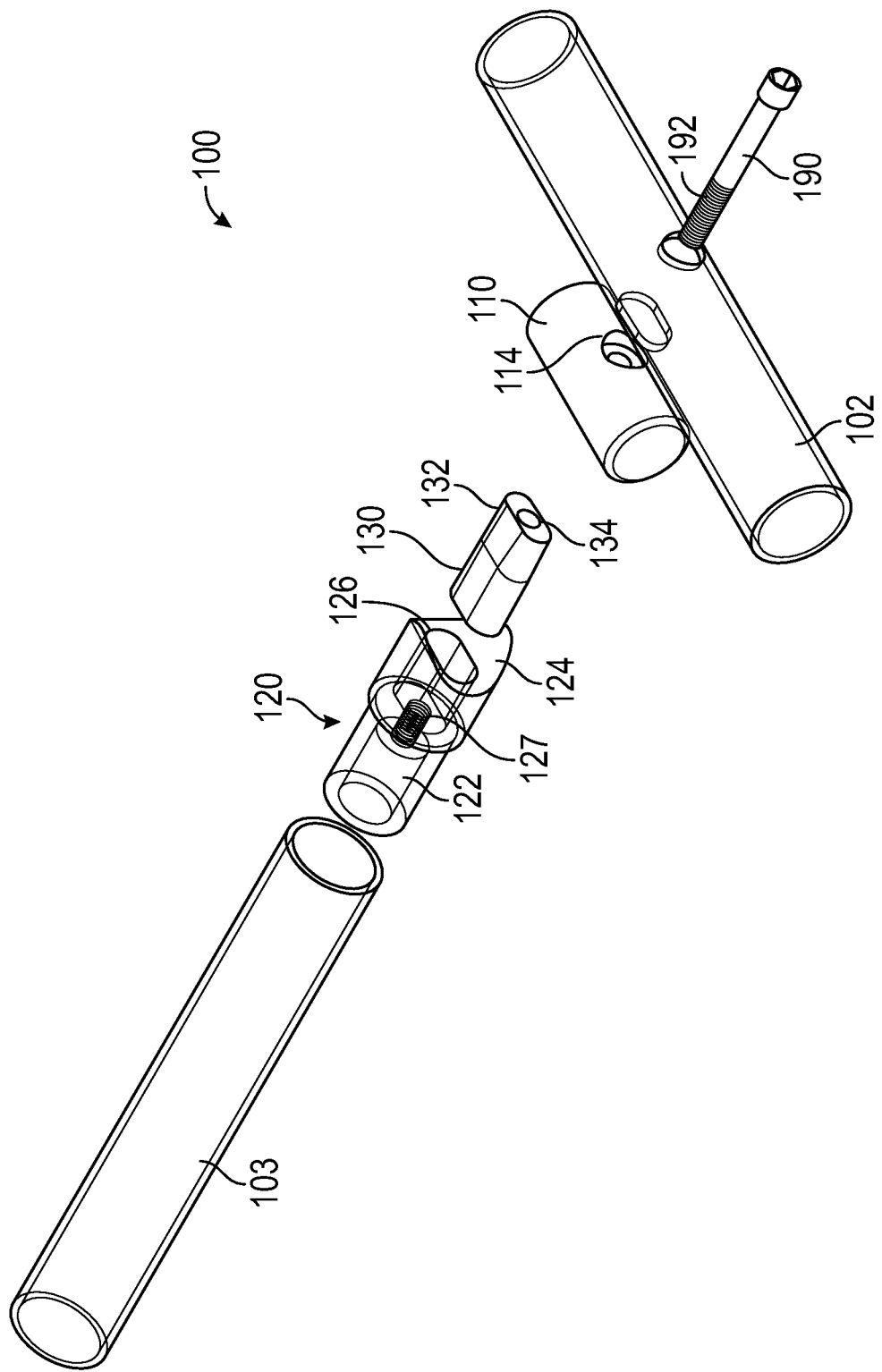
FIG. 4 is an exploded view of the connector assembly of FIG. 1.
Figure 5:
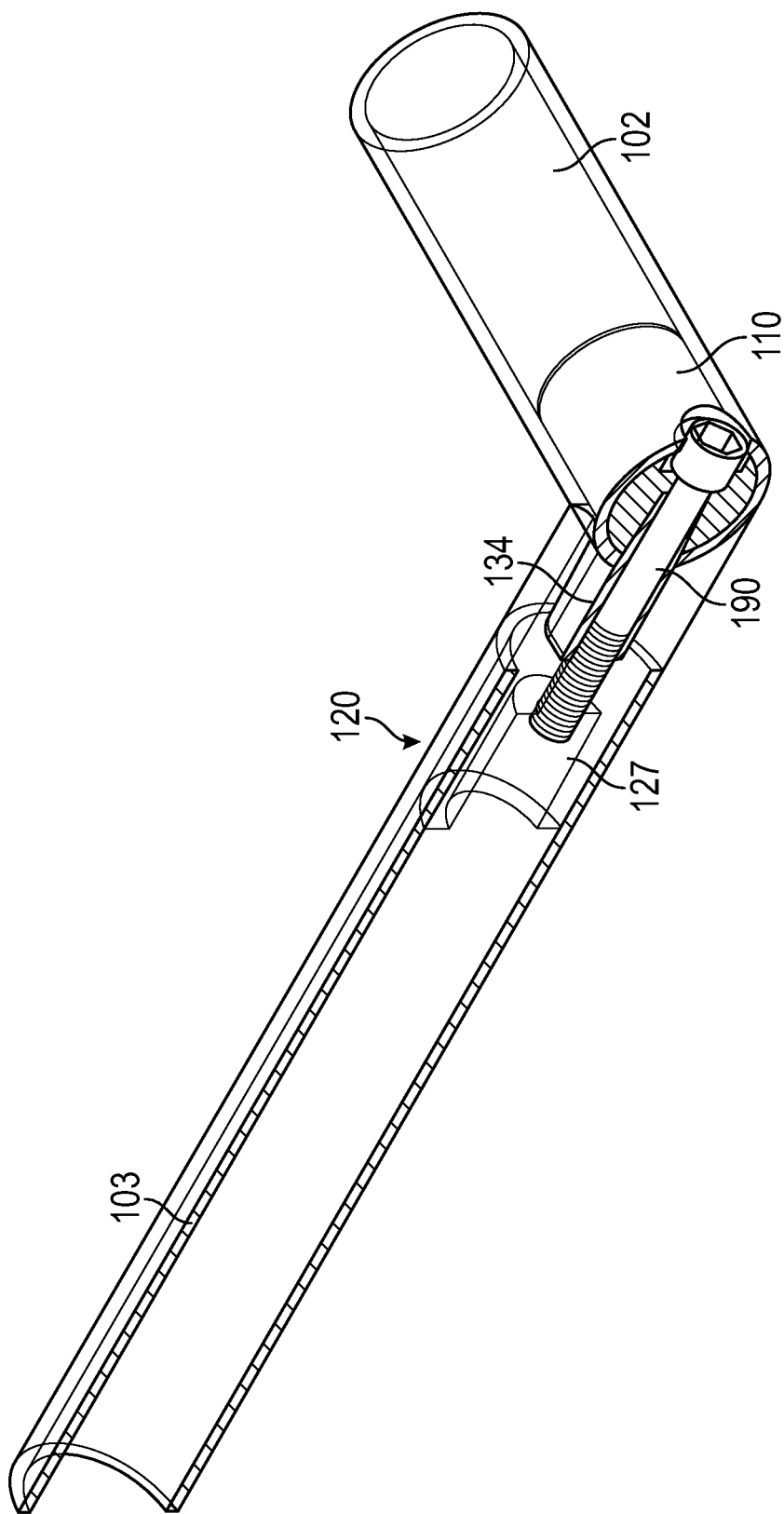
FIG. 5 is a cross-sectional view of the connector assembly of FIG. 1.
Figure 6:
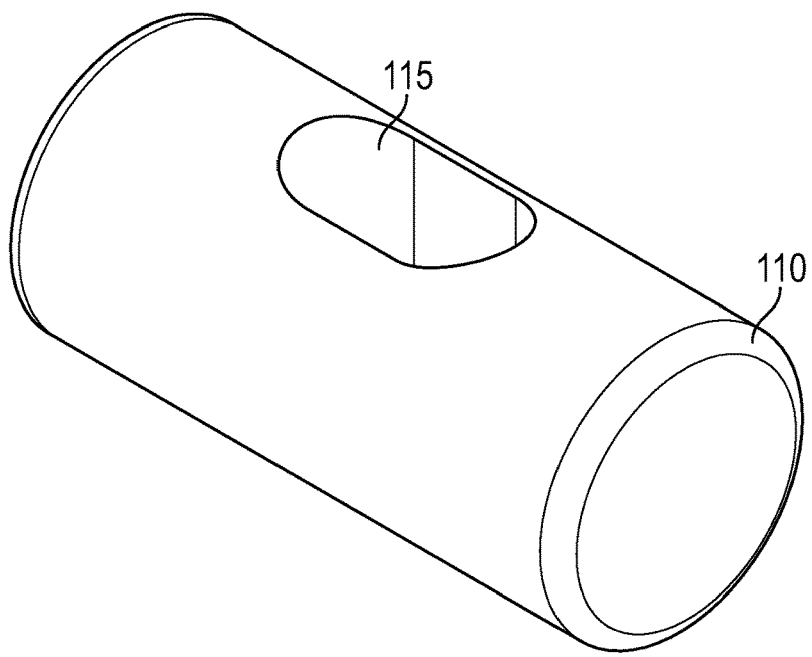
FIG. 6 is a perspective view of the cylindrical anchor plug view of the connector assembly of FIG. 1.
Figure 7A:
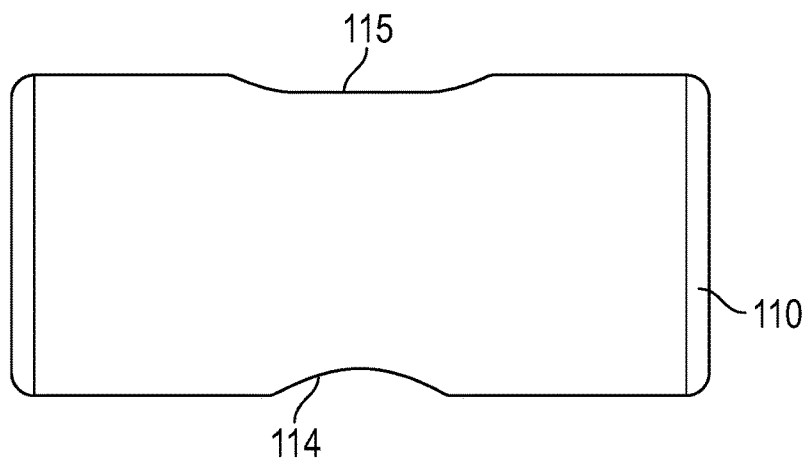
FIGS. 7A-7C are respective side, top and bottom views of the cylindrical anchor plug of FIG. 6.
Figure 7B:
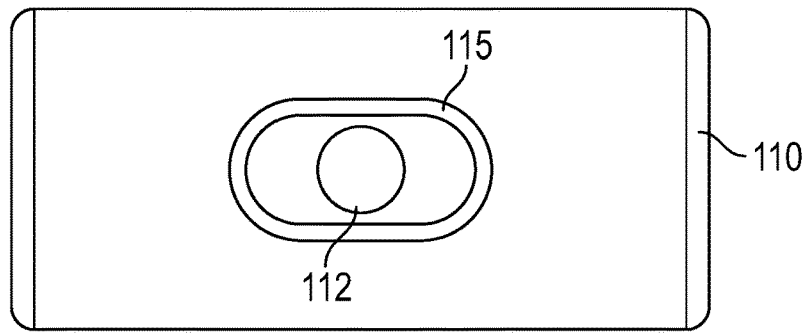
Figure 7C:
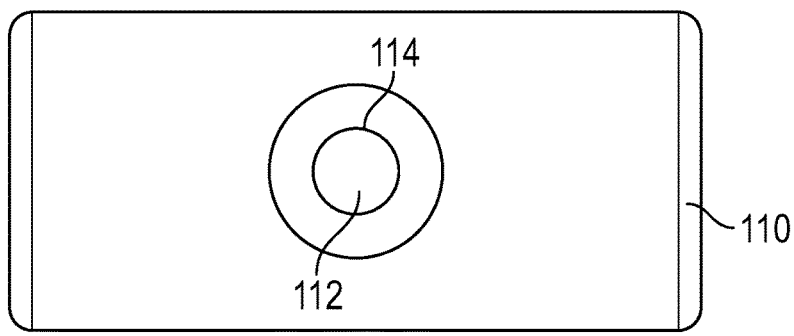
Figure 8:
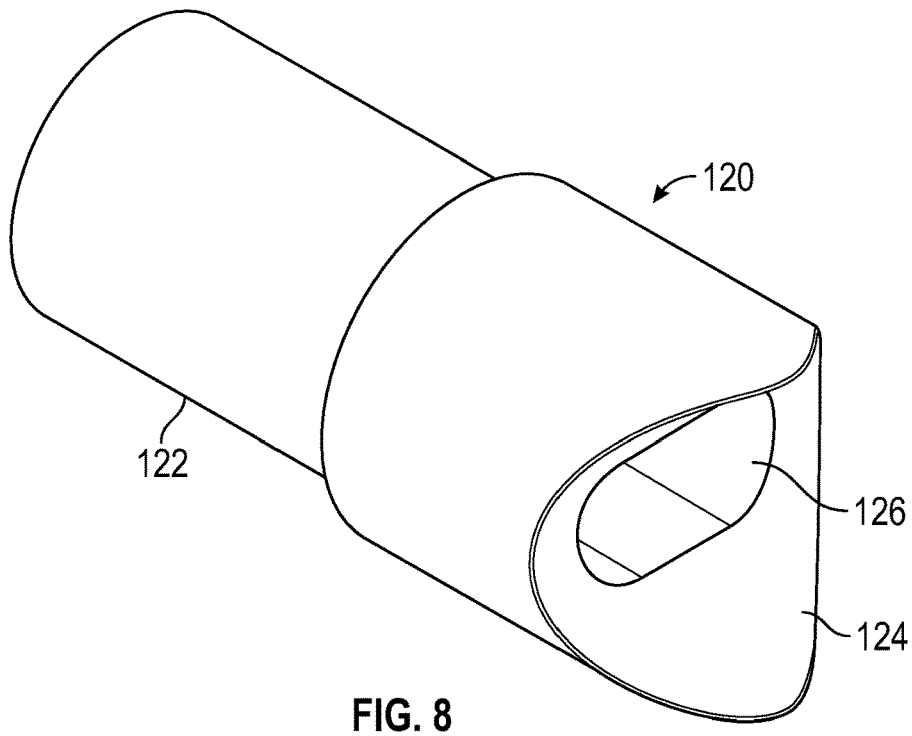
FIG. 8 is a perspective view of the cylindrical connector fitting of the connector assembly of FIG. 1.
Figure 9A:
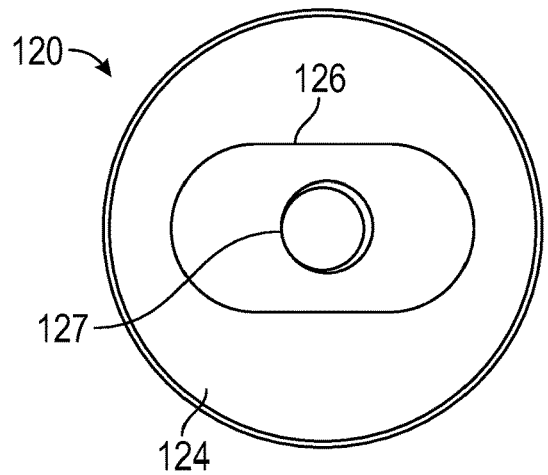
FIGS. 9A and 9B are respective top and bottom views of the cylindrical connector fitting of FIG. 8.
Figure 11:
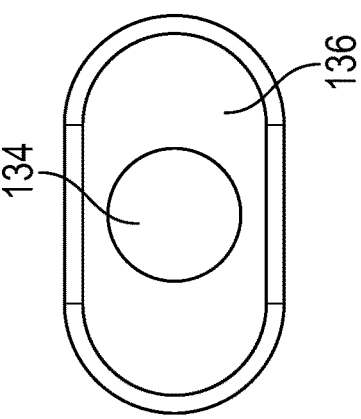
FIG. 11 is a bottom view of the torsion bar of FIG. 10.
Figure 10:
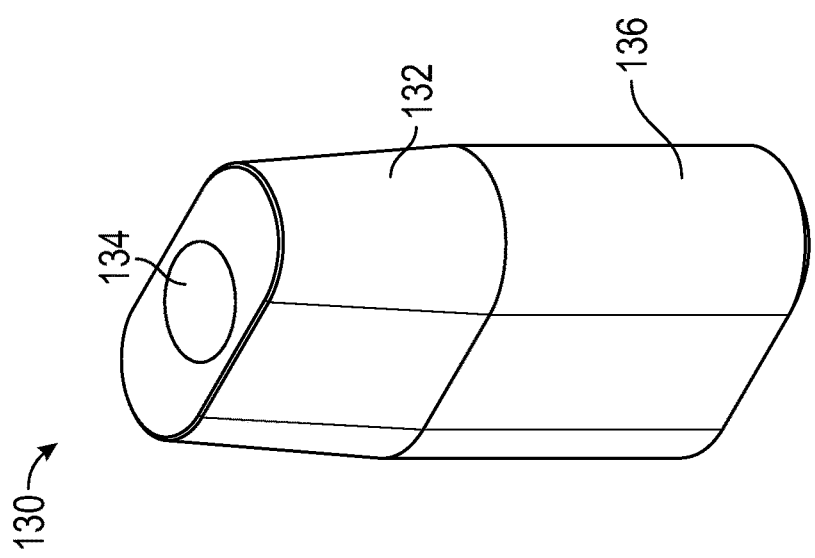
FIG. 10 is a perspective view of the torsion bar of the connector assembly of FIG. 1.
Figure 9B:
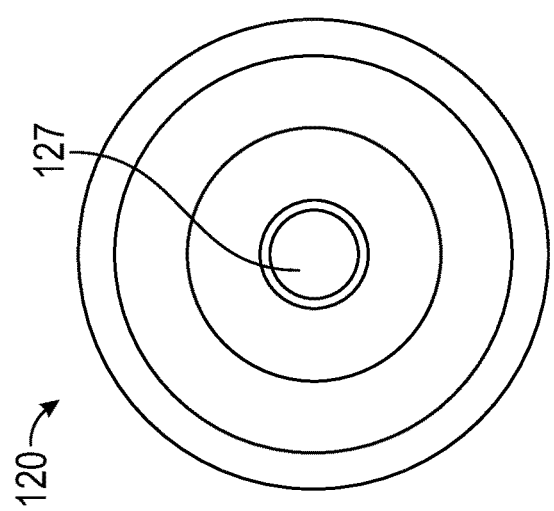

FIG. 1 illustrates an embodiment of a connector assembly 100, joining hollow tubular elements 102, 103, in accordance with features of the present invention. FIG. 2 is a plan view, FIG. 3A is a top view, FIG. 3B is a bottom view, FIG. 4 is an exploded view, and FIG. 5 is a cross-sectional view. A hollow structural tube or tubular element is a type of metal profile with a hollow cross-section and can be circular, square, or rectangular, although other shapes such as elliptical are also available. The following description may refer to circular hollow tubular elements and cylindrical components for ease of discussion but other shapes are contemplated. Other materials for the tubular elements 102, 103 are also contemplated.

The connector assembly 100 is configured to securely and reliably join the first and second hollow tubular elements 102, 103 in a perpendicular orientation (e.g., a T connection). Other orientations and angles of joining hollow tubular elements are contemplated. The connector assembly 100 includes an anchor plug 110 configured to be inserted into the first hollow tubular element 102, and having a transverse fastener through-hole 112 extending from first and second anchor plug openings 114, 115. The second anchor plug opening 115 is elongated. The first opening 114 in the anchor plug may include a counterbore 116 to receive a head of a fastener 190. The second anchor plug opening 115 may be elongated in an axial direction of the anchor plug 110.

Of course, openings will need to be formed in the first hollow tubular element 102 that correspond with (e.g. match with) the first and second anchor plug openings 114, 115. As such, the sung fit of the anchor plug 110 within the first hollow tubular element 102 will reinforce and strengthen the first hollow tubular element 102 which may be slightly weakened from the openings formed therein.

A connector fitting 120 has a reduced dimension portion 122 at a first end configured to be inserted into an end of the second hollow tubular element 103. The connector fitting 120 has a receiving portion 124 at a second end configured to receive an exterior surface of the first hollow tubular element 102. The receiving portion 124 may be a cradle or saddle-shaped feature to receive the rounded exterior surface of the first tubular element 102. The connector fitting 120 includes an elongated-shaped receiver 126 extending inward from the receiving portion 124, and includes a fastener receiver 127 at a bottom of the elongated-shaped receiver 126. The fastener receiver 127 may be a threaded fastener to receive a threaded end 192 of the fastener 190.

Before the reduced dimension portion 122 of the connector fitting 120 is inserted, the end of the second hollow tubular element 103 is preferably reamed out to eliminate the anodized surface therein and also make the opening concentric. As such, an adhesive can be applied to the reduced diameter portion 122 which is then inserted into the end of the second hollow tubular element 103 for a secure fit and connection.

A torsion bar 130 is configured to extend between the anchor plug 110 and the connector fitting 120. The torsion bar 130 includes a tapered top 132 defining a wedge. The torsion bar 130 includes an axial fastener through-hole 134 extending from a bottom 136 to the tapered top 132 thereof.

In operation, when the fastener 190 is positioned and tightened within the transverse fastener through-hole 112, the axial fastener through-hole 134 and the fastener receiver 127, the bottom 136 of the torsion bar 130 is rigidly secured within the elongated-shaped receiver 126 of the connector fitting 120, and the tapered top 132 of the torsion bar 130 is rigidly secured within the anchor plug 110 via the second anchor plug opening 115. As mentioned, openings will need to be formed in the first hollow tubular element 102 that correspond with (e.g. match with) the first and second anchor plug openings 114, 115.

As illustrated, for example, the elongated-shaped receiver 126 is stadium-shaped, a cross-section of the torsion bar 130 is stadium-shaped, and the second anchor plug opening 115 of the anchor plug 110 is stadium-shaped. Other shapes are contemplated as long as they provide the stability and reliability desired.

All components of the connector assembly 100 and hollow tubular elements 102, 103 may be made of aluminum (e.g., 60-61 T6) and anodized (e.g., Type 3 hard anodizing) after any holes or openings are formed therein. Of course, other materials and surface hardening/protecting are contemplated.

As illustrated, the first and second hollow tubular elements 102, 103 to be joined are cylindrical hollow tubular elements, and the anchor plug 110 is a cylindrical anchor plug, and the connector fitting 120 is a cylindrical connector fitting. As discussed above, other shapes of tubular elements are contemplated with corresponding shapes of components of the connector assembly 100.

Another embodiment of the present invention is directed to a method of joining first and second hollow tubular elements 102, 103. The method includes: inserting the anchor plug 110 into the first hollow tubular element 102; forming corresponding first and second tube openings in the first hollow tubular element 102, wherein the second tube opening is elongated to match up with the second anchor plug opening 115 of the first hollow tube element 102; inserting a connector fitting 120, having a reduced dimension portion 122 at a first end, into an end of the second hollow tubular element 103; inserting a bottom 136 of a torsion bar 130 into the elongated-shaped receiver 126 of the connector fitting 120; inserting, the tapered top 132 of the torsion bar 130 into the second anchor plug opening 115 of the anchor plug via the second tube opening of the first hollow tubular element 102, the tapered top 132 defining a wedge; and positioning and tightening a fastener 190 within the transverse fastener through-hole 112, the axial fastener through-hole 134 and the fastener receiver 127, to rigidly secure the bottom 136 of the torsion bar 130 within the elongated-shaped receiver 126 of the connector fitting 120, rigidly secure the tapered top 132 of the torsion bar 130 within the anchor plug 110 via the second anchor plug opening 115, and rigidly secure the receiving portion 124 to the exterior surface of the first hollow tubular element 102 adjacent the second tube opening therein.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

The invention claimed is:

1. A connector assembly configured to join first and second hollow tubular elements, the connector assembly comprising:
   a cylindrical anchor plug configured to be inserted into the first hollow tubular element, and comprising a transverse fastener through-hole extending from first and second anchor plug openings, wherein the second anchor plug opening is elongated;
   a cylindrical connector fitting having a reduced diameter portion at a first end configured to be inserted into an end of the second hollow tubular element, and having an arcuate receiving portion at a second end configured to receive a rounded surface of the first hollow tubular element;
   the cylindrical connector fitting including an elongated-shaped receiver extending inward from the arcuate receiving portion, and including a fastener receiver at a bottom of the elongated-shaped receiver; and
   a torsion bar configured to matingly extend between the cylindrical anchor plug and the cylindrical connector fitting;
   the torsion bar including an axial fastener through-hole extending from a bottom to a tapered top thereof;
   wherein the bottom of the torsion bar is configured to be rigidly secured within the elongated-shaped receiver of the cylindrical connector fitting, and the tapered top of the torsion bar is configured to be rigidly secured within the cylindrical anchor plug via the second insert opening, when a fastener is positioned and tightened within the transverse fastener through-hole, the axial fastener through-hole and the fastener receiver.

2. The connector assembly according to claim 1, wherein the fastener receiver comprises a threaded fastener receiver to receive a threaded end of the fastener.

3. The connector assembly according to claim 1, wherein the cylindrical anchor plug comprises a counterbore at the first anchor plug opening to receive a head of the fastener.

4. The connector assembly according to claim 1, wherein the second anchor plug opening is elongated in an axial direction of the cylindrical anchor plug.

5. The connector assembly according to claim 1, wherein the elongated-shaped receiver is stadium-shaped, a cross-section of the torsion bar is stadium-shaped, and the second insert opening of the cylindrical anchor plug is stadium-shaped.

6. The connector assembly according to claim 1, wherein the tapered top of the torsion bar defines a wedge.

7. A connector assembly configured to join first and second hollow tubular elements, the connector assembly comprising:
   an anchor plug configured to be inserted into the first hollow tubular element, and comprising a transverse fastener through-hole extending from first and second anchor plug openings, wherein the second anchor plug opening is elongated;

a connector fitting having a reduced dimension portion at a first end configured to be inserted into an end of the second hollow tubular element, and having a receiving portion at a second end configured to receive an exterior surface of the first hollow tubular element;

the connector fitting including an elongated-shaped receiver extending inward from the receiving portion, and including a fastener receiver at a bottom of the elongated-shaped receiver; and a torsion bar configured to extend between the anchor plug and the connector fitting, and including a tapered top defining a wedge;

the torsion bar including an axial fastener through-hole extending from a bottom to the tapered top thereof;

wherein, in operation, when a fastener is positioned and tightened within the transverse fastener through-hole, the axial fastener through-hole and the fastener receiver, the bottom of the torsion bar is rigidly secured within the elongated-shaped receiver of the connector fitting, and the tapered top of the torsion bar is rigidly secured within the anchor plug via the second anchor plug opening.

8. The connector assembly according to claim 7, wherein the fastener receiver comprises a threaded fastener receiver to receive a threaded end of the fastener.

9. The connector assembly according to claim 7, wherein the first opening in the anchor plug comprises a counterbore at the first anchor plug opening to receive a head of the fastener.

10. The connector assembly according to claim 7, wherein the second anchor plug opening is elongated in an axial direction of the anchor plug.

11. The connector assembly according to claim 7, wherein the elongated-shaped receiver is stadium-shaped, a cross-section of the torsion bar is stadium-shaped, and the second anchor plug opening of the anchor plug is stadium-shaped.

12. The connector assembly according to claim 7, wherein the first and second hollow tubular elements to be joined are cylindrical hollow tubular elements; and wherein the anchor plug comprises a cylindrical anchor plug, and the connector fitting comprises a cylindrical connector fitting.

13. A method of joining first and second hollow tubular elements, the method comprising:

inserting an anchor plug into the first hollow tubular element, the anchor plug comprising a transverse fastener through-hole extending from first and second anchor plug openings, wherein the second anchor plug opening is elongated;

forming corresponding first and second tube openings in the first hollow tubular element, wherein the second tube opening is elongated to match up with the second anchor plug opening of the first hollow tube element;

inserting a connector fitting, having a reduced dimension portion at a first end, into an end of the second hollow tubular element;

the connector fitting having a receiving portion at a second end configured to receive an exterior surface of the first hollow tubular element;

the connector fitting including an elongated-shaped receiver extending inward from the receiving portion, and including a fastener receiver at a bottom of the elongated-shaped receiver;

inserting a bottom of a torsion bar into the elongated-shaped receiver of the connector fitting;

inserting, a tapered top of the torsion bar into the second anchor plug opening of the anchor plug via the second tube opening of the first hollow tubular element, the tapered top defining a wedge;

the torsion bar including an axial fastener through-hole extending from the bottom to the tapered top thereof;

positioning and tightening a fastener within the transverse fastener through-hole, the axial fastener through-hole and the fastener receiver, to rigidly secure the bottom of the torsion bar within the elongated-shaped receiver of the connector fitting, rigidly secure the tapered top of the torsion bar within the anchor plug via the second anchor plug opening, and rigidly secure the receiving portion to the exterior surface of the first hollow tubular element adjacent the second tube opening therein.

14. The method according to claim 13, wherein the fastener receiver comprises a threaded fastener receiver to receive a threaded end of the fastener.

15. The method according to claim 13, wherein the first opening in the anchor plug comprises a counterbore to receive a head of the fastener.

16. The method according to claim 13, wherein the second anchor plug opening is elongated in an axial direction of the anchor plug, and the second tube opening of the first hollow tube element is elongated in an axial direction of the first hollow tube element.

17. The method according to claim 13, wherein the elongated-shaped receiver is stadium-shaped, a cross-section of the torsion bar is stadium-shaped, the second anchor plug opening of the anchor plug is stadium-shaped, and the second tube opening of the first hollow tube element is stadium-shaped.

18. The method according to claim 13, wherein the first and second hollow tubular elements to be joined are cylindrical hollow tubular elements; and wherein the anchor plug comprises a cylindrical anchor plug, and the connector fitting comprises a cylindrical connector fitting.

* * * * *